June 23, 1964 H. T. WHITE 3,138,105
MOTOR DRIVEN PUMPS
Filed Feb. 8, 1961 2 Sheets-Sheet 1

INVENTOR.
HOWARD T. WHITE
BY
ATTORNEY

June 23, 1964  H. T. WHITE  3,138,105
MOTOR DRIVEN PUMPS
Filed Feb. 8, 1961  2 Sheets—Sheet 2
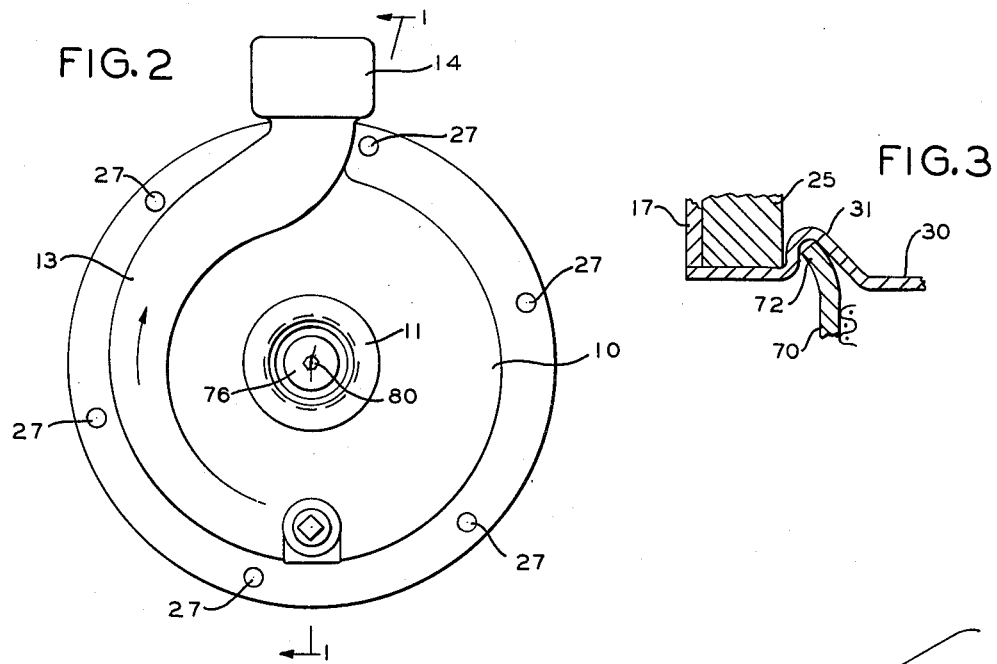
FIG. 2
FIG. 3
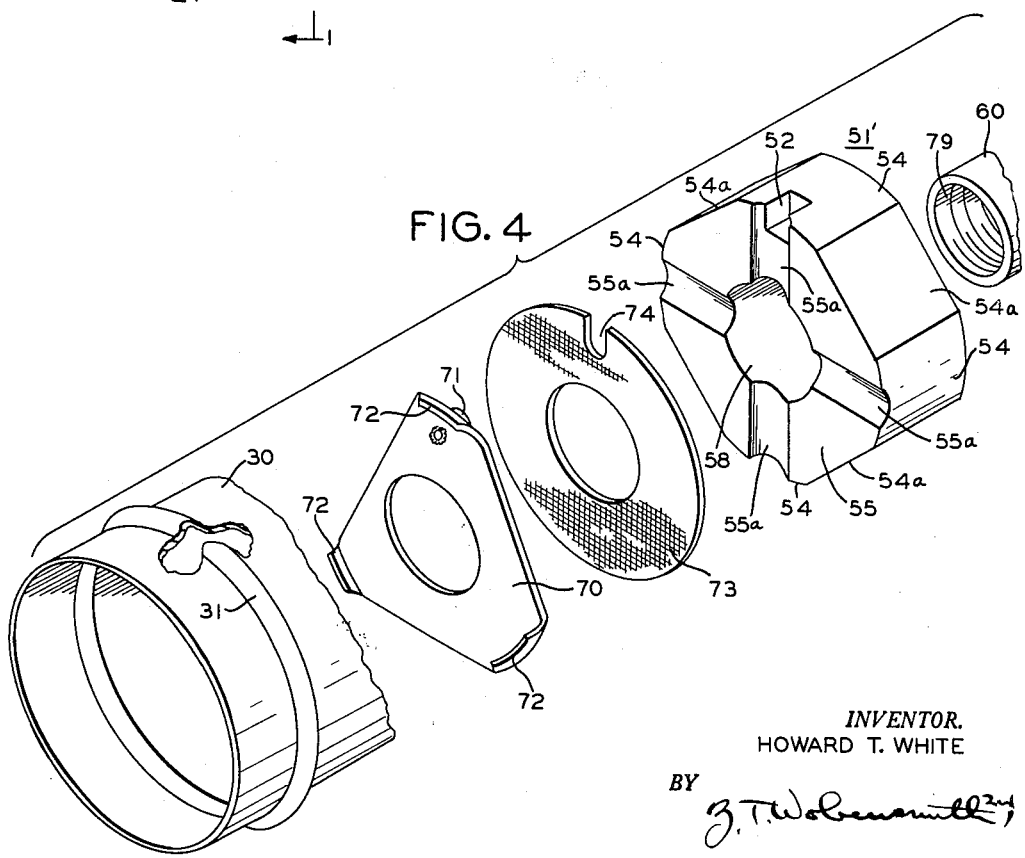
FIG. 4
*INVENTOR.*
HOWARD T. WHITE
BY
*[signature]*
ATTORNEY

United States Patent Office 3,138,105
Patented June 23, 1964

3,138,105
MOTOR DRIVEN PUMPS
Howard T. White, Melrose Park, Pa., assignor to Fostoria Corporation, Huntingdon Valley, Pa., a corporation of Ohio
Filed Feb. 8, 1961, Ser. No. 87,855
7 Claims. (Cl. 103—87)

This invention relates to motor driven pumps.

In the construction of motor driven pumps, problems have arisen particularly with respect to the retention of the alignment of the bearings for the motor and pump shaft.

It is the principal object of the present invention to provide a motor driven pump in which the necessity for alignment of the bearings as heretofore required, is rendered unnecessary, the bearings being self aligning and retained in alignment by fluid.

It is a further object of the present invention to provide a motor driven pump in which the problems of bearing alignment are greatly simplified and in which a fluid cushioning of the bearing blocks is provided.

It is a further object of the present invention to provide a simple but effective structure for accommodating the thrust balance effective on the rotor assembly of a motor driven pump.

It is a further object of the present invention to provide a motor driven pump having improved arrangements for hydraulic thrust balance so that no thrust washers are necessary.

It is a further object of the present invention to provide a motor driven pump having improved arrangements for hydraulic thrust balance which includes an orifice of fixed size and a variable orifice.

It is a further object of the present invention to provide an improved construction of motor driven pumps in which the motor rotor and pump impeller can be quickly and easily assembled and disassembled.

It is a further object of the present invention to provide an improved construction of motor driven pumps in which the motor stator can be quickly and easily assembled and disassembled and in which the motor stator is isolated from the motor rotor for protection of the motor stator windings from the fluid being pumped.

It is a further object of the present invention to provide an improved construction of motor driven pump in which the weight of the motor parts is carried by a plate at one end of the motor and contiguous to the pump housing.

It is a further object of the present invention to provide a motor driven pump which does not require stuffing boxes and rotating shaft seals and which can be relatively inexpensively constructed with a minimum of maintenance.

It is a further object of the present invention to provide an improved motor driven pump in which an enclosed motor rotor chamber is provided in communication with the fluid being pumped, and with circulation of a portion of the fluid being pumped for cooling of the motor and lubrication of the motor bearings.

Other objects and advantageous features of the invention will be apparent from the description and claims.

The nature and characteristic features of the invention will be more readily understood from the following description, taken in connection with the accompanying drawings forming part thereof, in which:

FIG. 2 is an end elevational view on a smaller scale of the motor driven pump shown in FIG. 1 as seen from the left;

FIG. 3 is an enlarged fragmentary sectional view showing the mounting of the bearing retainer in the isolating sleeve; and FIG. 4 is an exploded perspective view showing the relationship of the motor stator isolating sleeve, the bearing retainer, the screen, one of the bearings, and the motor shaft.

Figure 1:
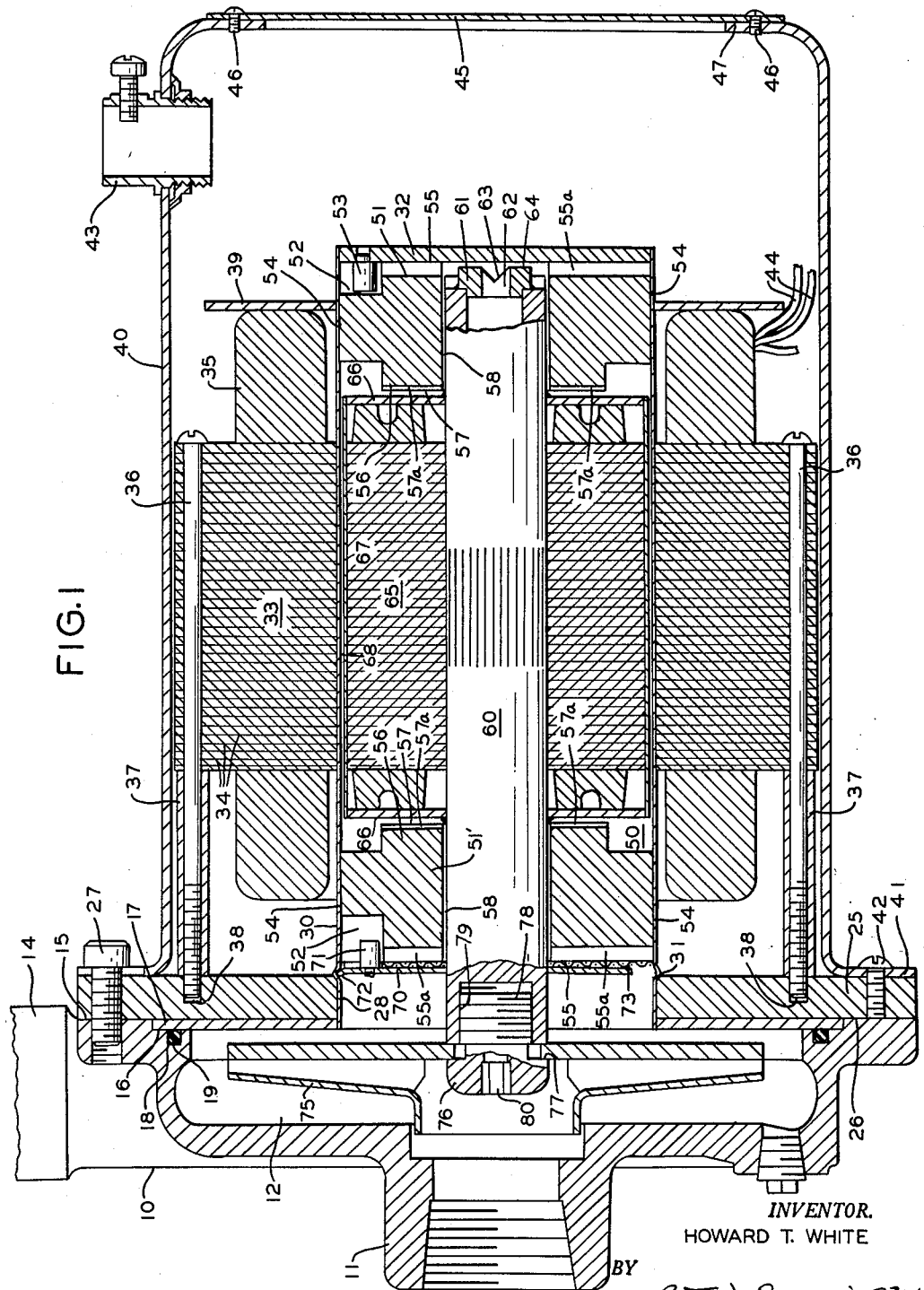
FIGURE 1 is a vertical central sectional view of a preferred form of motor driven pump in accordance with the present invention, and taken approximately on the line 1—1 of FIG. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is shown, an impeller housing 10 is provided having a longitudinal axial centrally disposed fluid inlet connection 11 in communication with the interior fluid space or impeller chamber 12. The fluid space 12 includes a scroll 13 of a well known type. The impeller housing 10 has a fluid delivery connection 14 formed thereon and in communication with the interior of the scroll 13 for the delivery of the fluid being pumped.

The impeller housing 10 has a flat end face 15 with an annular groove 16 for the reception of the peripheral portion of a liner plate 17 and may further be provided with an annular recess 18 for the reception of a sealing ring 19 of any preferred type, such as an O-ring, in fluid tight sealing engagement with the liner plate 17.

The impeller housing 10 and liner plate 17 can be of any preferred material resistant to erosion or corrosion by the liquid being pumped, and for certain applications can advantageously be made of stainless steel.

A supporting plate 25 is provided having a face portion 26 adapted to be clamped in engagement with the end face 15 of the impeller housing 10 in any desired manner, such as by studs 27. The supporting plate 25 in clamped position also retains the liner plate 17 in position and in sealed engagement with the sealing ring 19. The liner plate 17 may be secured to the supporting plate 25 in any desired manner but is preferably held as hereinafter explained.

The supporting plate 25 and liner plate 17 preferably have an aligned central opening 28 within which a cylindrical sleeve 30 is mounted. The cylindrical sleeve 30 may be of any desired material which is non-magnetic responsive, and which is resistant to corrosion by the liquid being pumped. For a number of types of installations, the sleeve 30 can advantageously be of stainless steel. The sleeve 30 is secured at one end in any desired manner, such as by linear welding to the plate 17 and preferably has an outwardly expanded annular groove 31 formed therein along the edge of the supporting plate 25 opposite that on which the liner plate 17 is disposed.

The sleeve 30 is of any preferred length, dependent upon the size of the motor and is closed at its opposite end by an end closure plate 32 welded or otherwise secured thereto to prevent fluid leakage at this location.

The sleeve 30 serves as a separator and isolating element for the stator of the motor and as a mounting element upon which the motor stator 33 of an alternating current electric motor is disposed. The stator 33 includes stator laminations 34 and stator windings 35.

The stator 33 is preferably held in assembled relation to the sleeve 30 and to the supporting plate 25 by screws 36 which extend through the laminations 34, through spaced sleeves 37 and into threaded engagement in blind holes 38 in the supporting plate 25. The screws 36 and sleeves 37 preferably serve as the entire support and retaining structure for the motor stator 33 so that a minimum of stress or no stress is transferred to the sleeve 30 from the laminations 34.

An end protective disc 39 of vulcanized fibre or other suitable material may be provided in frictional engagement with the exterior of the sleeve 30 and in engagement with the outer end of the stator windings 35 to prevent accidental injury to the stator windings 35.

An outer motor housing 40 is provided, preferably of substantially cylindrical shape, having an outwardly disposed end flange 41 which is secured to the supporting plate 25 in any desired manner, such as by screws 42 extending through the flange 41 and in threaded engagement in the supporting plate 25. The housing 40 can be provided with a conductor sleeve 43 for the passage of the conductors 44 for energizing the windings 35.

The outer end of the motor housing 40 can be closed in any desired manner, such as by an end closure plate 45 held in position by screws 46 in threaded engagement with the inturned end flange 47 of the motor housing 40.

Within the interior of the sleeve 30, a motor rotor chamber 50 is provided and at the end thereof remote from the impeller housing 10 a bearing block 51 similar in shape to that shown in detail in FIG. 4 is provided. The bearing block 51 has a slot 52 at its periphery for the reception of a pin 53 carried by the end closure plate 32 for preventing turning of the bearing block 51. The bearing block 51 can be made of any desired material, preferably a material lubricated by the liquid being pumped, and for some types of installation, can advantageously be made of graphite.

The bearing block 51 preferably has outer curved face portions in loose engagement with the interior of the sleeve 30, and with clearances of the order of two one thousandths of an inch and has interposed flat faces 54a for fluid flow. The bearing block 51 has an end face 55 with radial grooves 55a thereon for fluid flow and opposite thereto has a boss 56 with an end face 57. The end face 57 has a plurality of radial end face grooves 57a for fluid flow. The bearing block 51 has a central shaft receiving opening 58 for the reception of one end of a motor rotor shaft 60.

The shaft 60 is preferably a hollow shaft and is provided at the end contiguous to the bearing block 51 with an enclosure plug 61 permanently secured thereto in any desired manner, such as by welding. The closure plug 61 has a fluid flow opening 62 therethrough and radial end face groove 63 are provided for permitting fluid flow to and through the opening 62. The end face 64 of the closure plug 61 provides with the inner face of the end closure plate 32 a variable orifice for purposes to be explained.

The shaft 60 has mounted thereon, a motor rotor 65 of any preferred type, which can advantageously be of the short circuited type, and is enclosed within an enclosure which includes end plates 66 connected by a cylindrical enclosure 67. The external diameter of the enclosure 67 and the internal diameter of the sleeve 30 are such that there is a gap of the order of twenty one thousandths of an inch providing an orifice 68 of fixed dimensions therebetween for purposes to be explained.

The end plates 66 and cylindrical enclosure 67 are preferably welded together at their meeting portions to prevent fluid leakage and the end plates 66 are preferably welded to the shaft 60 to prevent fluid leakage. One of the end plates 66 may act as a thrust bearing against the end face 57 of the bearing block 51.

Within the interior of the sleeve 30, an additional bearing block 51′ is provided, illustrated in FIG. 4, is the same in shape as that previously described, has a central shaft receiving opening 58 for the shaft 60 and is held in position by a holding plate 70 which has a pin 71 carried thereon for engagement with a slot 52 at the periphery of the bearing block 51′ and has an end face 57 for engagement with the contiguous end plate 66 of the rotor enclosure.

The total clearance between the shaft 60 and the bearing blocks 51 and 51′ at the openings 58 is of the order of three one-thousandths of an inch.

The holding plate 70 is preferably of substantially triangular shape with end strips 72 which are adapted to be snapped into the groove 31 in the sleeve 30 to retain the same in position. A screen 73 of foraminous material resistant to corrosion by the liquid being pumped is preferably interposed between the plate 70 and the contiguous end face 55 of the bearing block 51′, and is held against rotation with the shaft 60 by the pin 71 extending through a slot 74 in the periphery thereof.

The shaft 60 extends through the holding plate 70 and into the impeller chamber 12 and preferably has a fluid impeller 75 mounted thereon for rotation therewith. The impeller 75 is preferably held on the shaft 60 by an impeller lock screw 76 having a face portion 77 in engagement with the impeller 75 and a threaded end 78 in interior engagement with an interiorly threaded portion 79 in the shaft 60. The lock screw 76 is provided with a central opening 80 for fluid flow, as hereinafter pointed out.

The motor stator 33 of the motor driven pump herein described can be readily assembled to the sleeve 30 by sliding the stator 33 along the exterior thereof and inserting the screws 36 through the sleeves 37 and into threaded engagement in the supporting plate 25. The end protective disc 39 can then be placed in position. The outer motor housing 40 can also be readily secured in position with respect to the supporting plate 25 upon insertion and tightening of the screws 42. Access for positioning the conductors 44 through the conductor sleeve 43 can be had through the opening normally closed by the end closure plate 45.

The motor rotor and impeller assembly can also be quickly assembled with respect to the sleeve 30. The bearing blocks 51 and 51′ are positioned at opposite sides of the motor rotor 65 and the bearing block 51 is moved so that the pin 53 is in engagement in the slot 62. With the bearing block 51′ on the shaft 60 and the holding plate 70 and screen 73 are shifted so that the pin 71 extends through the slot 74 and is in engagement in the slot 52. The end strips 72 of the plate 70 may then be snapped into the groove 31. The impeller 75 can be placed in position and secured by the lock screw 76 before the insertion of the bearing blocks 51 and 51′ or subsequently, as desired.

As previously indicated the bearing blocks 51 and 51′ are in relatively loose engagement at their curved face portions 54 with the interior of the sleeve 30.

Upon energization of the windings 35, a rotating field is set up in the stator laminations 34 and the motor rotor 65 is caused to rotate. Rotation of the motor rotor 65 effects rotation of the shaft 60 and the impeller 75 carried thereon.

Fluid supplied through the fluid inlet connection 11 is delivered by the impeller 75 to the outer portion of the fluid space 12 and to the scroll 13 for delivery through the fluid delivery connection 14. A portion of the fluid under pressure is delivered past the holding plate 70 and through the screen 73. The path of this fluid is divided, part passing to and through the grooves 55a to the exterior of the shaft 60 and through the clearance between the shaft 60 and the face of the opening 58 in the bearing block 51′ and then along the grooves 57a, being available through the grooves 57a to lubriate the contacting portions of the end plate 66 and the bearing face 57. Another part of the fluid passes along the faces 54a to the inner end of the bearing block 51′.

The fluid from the divided flow is then delivered to and through the orifice 68 between the cylindrical enclosure 67 and the sleeve 30. Part of the fluid passes to and through the grooves 57a to the exterior of the shaft 60 and through the clearance between the shaft 60 and the face of the opening 58 in the bearing block 51a. Another part of this fluid passes along the faces 54 of the bearing block 51 to the outer end thereof and through the grooves 55a.

Fluid at the outer end of the bearing block 51, is guided by the end closure plate 32 and passes through the grooves 63 and opening 62 to the interior of the shaft 60. The end of the shaft 60 with the end closure plug 61 therein provides a pressure responsive face and the end face 64 of the end closure plug 61 provides with the sleeve end closure plate 32 the variable orifice referred to above.

Fluid passing through the opening 62 moves along the interior of the shaft 60 and through the aperture at 80 to the low pressure region in the impeller space 12 and joins the fluid being impelled by the impeller 75.

The impeller 75 has pressure effective thereon in the impeller space 12 in one direction and in the space between the fixed orifice at 68 and the variable orifice between the end face 64 and the inner surface of the sleeve end closure plate 32. A variable force is applied in this latter space effective on the shaft 60. If the clearance at the variable orifice is caused to decrease then the pressure of the fluid supplied through the fixed orifice at 67 tends to increase and thereby exert pressure toward the left in FIG. 1. This pressure, when of sufficient magnitude to move the impeller shaft 60 toward the left, tends to increase the size of the variable orifice so that the pressure of the fluid in the balancing space is reduced by discharge through the opening 62. The control of the pressure in this manner tends to cause the pressure in the balancing space to arrive at an equilibrium or balanced condition with a minimum of movement required to restore the balanced condition.

The fluid circulating through and around the bearing blocks 51 and 51′ is effective for cooling and lubricating the contacting surfaces while at the same time with the clearances of the bearing blocks 51 and 51′ in the sleeve the fluid also serves as a cushion. The bearing blocks 51 and 51′ take self aligned positions and while a limited radial shifting of the bearing blocks 51 and 51′ can occur, it is resisted by the cushioning fluid between the faces 54 and the interior surface of the sleeve 30.

I claim:

1. A motor driven pump comprising a supporting plate with an impeller housing on one side thereof, and a motor housing on the other side thereof having a motor stator therein in spaced relation thereto, supporting members for said motor stator extending through said motor stator and into said supporting plate, said supporting plate having a central opening, a cylindrical sleeve extending from said supporting plate and having a free end in said motor housing, members for mounting the end of said sleeve opposite said free end in said opening, said mounting members providing the sole support for said sleeve, a closure member at the other end of said sleeve, the interior of said sleeve providing a motor rotor chamber in communication with the interior of said impeller housing, spaced bearing blocks in said sleeve insertable through said central opening, a shaft journaled in said bearing blocks and having a motor rotor thereon interposed between said bearing blocks, said shaft extending into said impeller housing and having a fluid impeller in said impeller housing, the assembly comprising said shaft, said bearing blocks and said motor rotor being supported from said supporting plate by said sleeve, and a member in said sleeve releasably retaining said assembly in said sleeve.

2. A motor driven pump comprising a supporting plate with an impeller housing on one side thereof and a motor housing on the other side thereof having a motor stator therein, said supporting plate having a central opening communicating with said impeller housing, a cylindrical sleeve mounted at one end in said opening and supported wholly by said supporting plate, said sleeve extending into said motor housing and within said motor stator, a closure member at the other end of said sleeve, the interior of said sleeve providing a motor rotor chamber in communication with the interior of said impeller housing, spaced bearing blocks in said sleeve having portions for fluid flow therealong, a shaft journaled in said bearing blocks and having a motor rotor thereon interposed between said bearing blocks, said shaft having a fluid passageway therealong, said shaft extending into said impeller housing and having a fluid impeller in said impeller housing, said motor rotor having an enclosure with the periphery in closely spaced relation to the interior surface of said sleeve and providing therewith a fixed longitudinal orifice, said shaft having a terminal end portion providing with the end closure of said sleeve a variable radial orifice, and the space within said sleeve between said orifices providing a pressure balancing chamber for application of a longitudinal axial positioning force on said shaft.

3. A motor driven pump as defined in claim 2 in which supporting members for said motor stator extend therethrough parallel to the longitudinal axis of the shaft and into engagement with said supporting plate.

4. A motor driven pump as defined in claim 2 in which said last member and said end closure member each have a projecting portion in engagement with one of said bearing blocks for holding said bearing blocks against rotation.

5. A motor driven pump as defined in claim 2 in which a fixedly mounted foraminous member is interposed between said plate member and a contiguous one of said bearing blocks.

6. A motor driven pump comprising a supporting plate with an impeller housing on one side thereof, and a motor housing on the other side thereof having a motor stator therein, said supporting plate having a central opening, a cylindrical sleeve mounted at one end in said opening and having a free end extending into said motor housing, a closure member at the free end of said sleeve, the interior of said sleeve providing a motor rotor chamber in communication at said mounted end with the interior of said impeller housing, spaced bearing blocks in said sleeve insertable through said central opening, a shaft journaled in said bearing blocks and having a motor rotor thereon interposed between said bearing blocks, said shaft having a fluid passageway therethrough in communication with said impeller housing, a fluid impeller on said shaft in said impeller housing, and members for retaining said bearing blocks in position in said sleeve, said members including an outwardly extending peripheral rim portion in said sleeve engaging said supporting plate, and a bearing block retainer plate member within said sleeve having circumferentially spaced peripheral portions engaged with said rim portion.

7. A motor driven pump comprising a supporting plate with an impeller housing on one side thereof, and a motor housing on the other side thereof having a motor stator therein, said supporting plate having a central opening, a cylindrical sleeve fixedly mounted at one end in said opening and having a free end extending into said motor housing, a closure member at the free end of said sleeve, the interior of said sleeve providing a motor rotor chamber in communication with the interior of said impeller housing, spaced bearing blocks in said sleeve having portions for fluid flow therealong, a hollow shaft journaled in said bearing blocks and having a motor rotor thereon interposed between said bearing blocks, said shaft extending into said impeller housing with the interior of the shaft in communication with the interior of the impeller housing, said shaft having a fluid impeller in said impeller housing, said motor rotor having an enclosure with the periphery in closely spaced relation to the interior surface of said sleeve and providing therewith a fixed longitudinal orifice, said shaft having an end portion providing with the end closure of said sleeve a variable radial orifice, and the space within said sleeve between said orifices providing a pressure balancing chamber for application of a longitudinal axial positioning force on said shaft.

References Cited in the file of this patent

UNITED STATES PATENTS

| | | |
|---|---|---|
| 2,741,990 | White | Apr. 17, 1956 |
| 2,809,590 | Brown | Oct. 15, 1957 |
| 2,844,101 | Burns et al. | July 22, 1958 |
| 2,871,791 | Litzenberg | Feb. 3, 1959 |
| 2,875,694 | Carter | Mar. 3, 1959 |
| 2,906,208 | White | Sept. 29, 1959 |
| 2,942,555 | Pezzillo | June 28, 1960 |
| 3,031,973 | Kramer | May 1, 1962 |